(12) United States Patent
Özdas et al.

(10) Patent No.: US 8,970,591 B2
(45) Date of Patent: Mar. 3, 2015

(54) MEMORY EFFICIENT PROGRESSIVE REFINEMENT IN RAY TRACING

(71) Applicant: Caustic Graphics, Inc., San Francisco, CA (US)

(72) Inventors: Cüneyt Özdas, Berkeley, CA (US); Steven Blackmon, Piedmont, CA (US)

(73) Assignee: Imagination Technologies, Limited, Kings Langley, Hertfordshire (GB)

( * ) Notice: Subject to any disclaimer, the term of this patent is extended or adjusted under 35 U.S.C. 154(b) by 293 days.

(21) Appl. No.: 13/687,535

(22) Filed: Nov. 28, 2012

(65) Prior Publication Data

US 2014/0146049 A1     May 29, 2014

(51) Int. Cl.
*G06T 15/06*     (2011.01)

(52) U.S. Cl.
CPC ...................................... *G06T 15/06* (2013.01)
USPC .......................................................... 345/426

(58) Field of Classification Search
CPC ....................................................... G06T 15/06
USPC .................................................. 345/419, 426
See application file for complete search history.

(56) References Cited

U.S. PATENT DOCUMENTS

2008/0238920 A1* 10/2008 Brown et al. .................. 345/426
2009/0322781 A1* 12/2009 Letavin et al. ................ 345/611
2013/0120385 A1* 5/2013 Krishnaswamy et al. .... 345/426

OTHER PUBLICATIONS

Painter and Sloan; Antialiased Ray Tracing by Adaptive Progressive Refinement; Computer Graphics, vol. 23, No. 3, Jul. 1989.*
Diodge et al. "Mixing Monte Carlo and Progressive Rendering for Improved Global Illumination" The Visual Computer. Jun. 2012, vol. 28, Issue 6-8, pp. 603-612 available at http://cs.swan.ac.uk/~csmark/PDFS/2012_CGI.pdf last checked Nov. 28, 2012.
Donikian Michael et al. "Accurate Direct Illumination Using Iterative Adaptive Sampling" IEEE Transactions on Visualization and Computer Graphics, Vol. 12, No. 3, May/Jun. 2006 pp. 353-364.
F James, "Monte Carlo theory and practice," Report on Progress in Physics, vol. 43, 1980, pp. 1145-1189, The Institute of Physics, Great Britain.
Fan et al. "Population monte carlo samplers for rendering" Technical report 1613 available at http://ftp.cs.wisc.edu/pub/techreports/2007/TR1613.pdf last checked Nov. 28, 2012.

(Continued)

*Primary Examiner* — Carlos Perromat
(74) *Attorney, Agent, or Firm* — Michael S. Garrabrants

(57) ABSTRACT

In one aspect, a method provides for iteratively taking passes of samples for each pixel of a set of pixels. Initially, the set of pixels can be all of the pixels of an image. For each pixel, an accumulated color at the beginning of a pass and at the end of a pass can be compared. If a difference between these is within a threshold, a convergence count, which begins at an initial value, is reduced. If the difference is not within the threshold, then the convergence count is reset. When the convergence count reaches a preset value, then the pixel is considered converged and removed from the set. However, if a pixel adjacent to a converged pixel fails a convergence test, then the converged pixel is reset to unconverged and returned to the set and at least a minimum number of additional sample passes are undertaken for that pixel.

23 Claims, 4 Drawing Sheets

(56) References Cited

OTHER PUBLICATIONS

Jensen "Monte Carlo Ray Tracing" Siggraph 2003 Course 44 available at http://geometry.caltech.edu last visited Nov. 28, 2012.
Kirk et al. "Unbiased sampling techniques for image synthesis" Computer Graphics vol. 25, No. 4 Jul. 1991.
Lee et al. "Statistically optimized sampling for distributed ray tracing" SIGGRAPH '85 Proceedings of the 12th annual conference on Computer graphics and interactive techniques vol. 19 Issue 3, Jul. 1985 pp. 61-68.
Mak, Wai-Kei et al. "Monte Carlo bounding techniques for determining solution quality in stochastic programs" Operations Research Letters 24 (1999) 47-56.
Mitchell "Consequences of Stratified Sampling in Graphics SIGGRAPH '96 Proceedings of the 23rd annual conference on Computer graphics and interactive techniques" pp. 277-280, 1996.
Perez et al. "Acceleration of Monte Carlo path tracing in general environments" Proceedings of the Eighth Pacific Conference on Computer Graphics and Applications, 2000.
Peter Shirley, Changyaw Wang and Kurt Zimmerman "Monte Carlo Techniques for Direct Lighting Calculations," ACM Transactions on Graphics, vol. 15, Issue 1, Jan. 1996, pp. 1-36, ACM, New York, New York.
Wachter "Quasi-Monte Carlo Light Transport Simulation by Efficient Ray Tracing" Phd Disseration (2008) Ulm University http://vts.uni-ulm.de/query/longview.meta.asp?document_id=6265.
William J. Morokoff and Russel E. Caflisch, "Quasi-Monte Carlo Integration," Journal of Computational Physics, vol. 122 , Issue 2, Dec. 1995, pp. 218-230,1995, published by Academic Press Professional, Inc., San Diego, CA.
William J. Morokoff and Russel E. Caflisch, "Quasi-random sequences and Their discrepancies," SIAM Journal of Scientific Computing, vol. 15, Issue 6, Nov. 1994, pp. 1251-1279, Philadelphia, PA.
Xu "A New Adaptive Sampling Technique for Monte Carlo Global Illumination" 10th IEEE International Conference on Computer-Aided Design and Computer Graphics, 2007.
Xu "A New Refinement Criterion for Adaptive Sampling in Path Tracing" I2010 IEEE International Symposium on ndustrial Electronics (ISIE), pp. 1556-1561, 2010.

\* cited by examiner

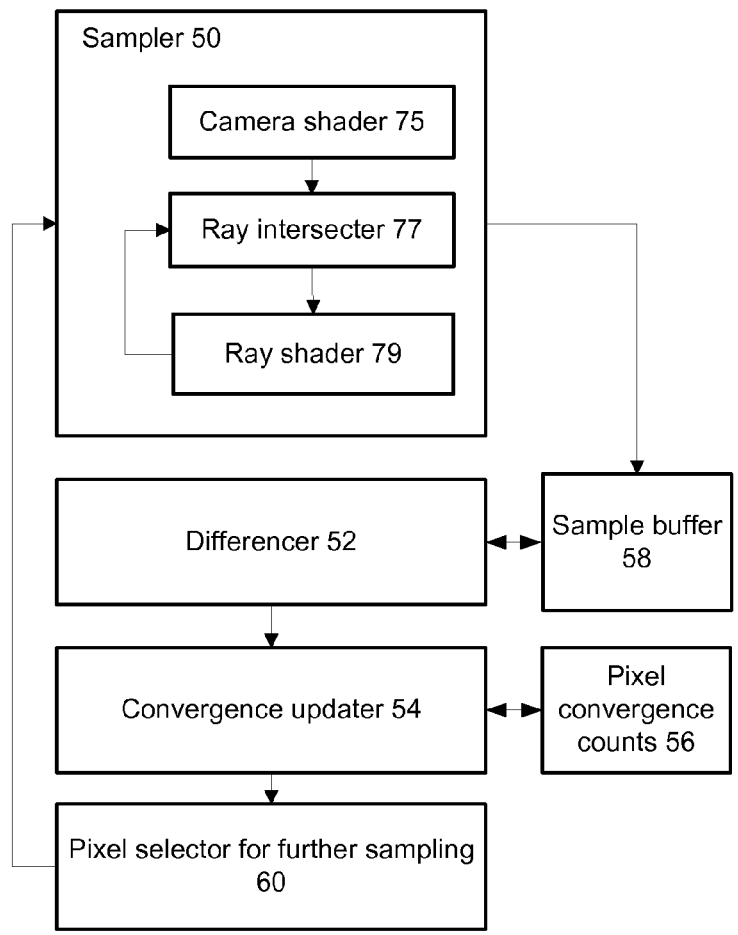
FIG. 1
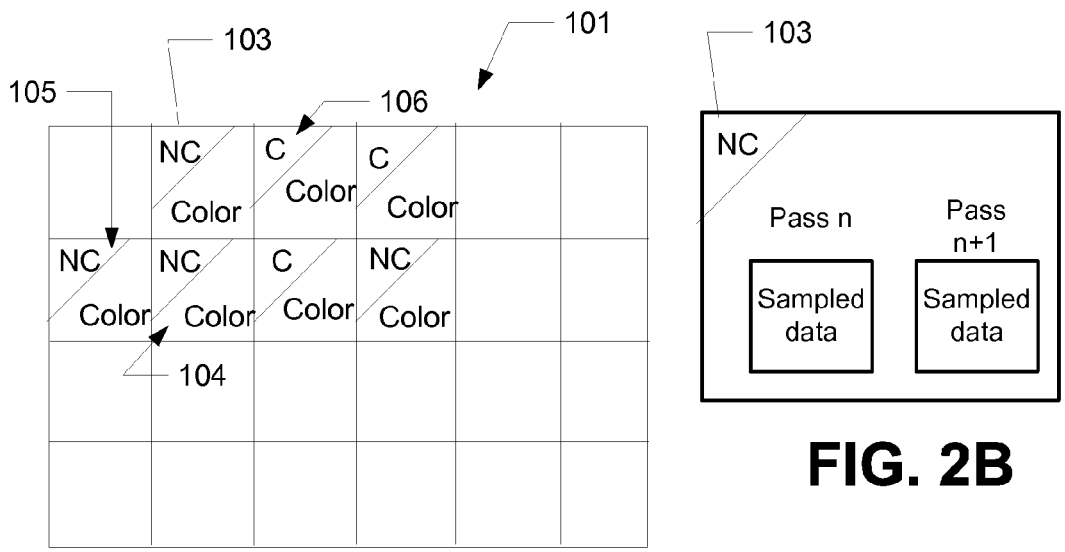
FIG. 2A
FIG. 2B

MEMORY EFFICIENT PROGRESSIVE REFINEMENT IN RAY TRACING

BACKGROUND

1. Field

The following relates to approaches for adaptive sampling in ray tracing and more particularly to approaches to progressive refinement of images produced using statistical sampling techniques.

2. Related Art

Rendering images from 3-D scenes using ray tracing is based on the theory of evaluating a rendering equation, which includes a number of nested integrals that model different light behaviors and which is difficult to solve analytically. Therefore, approximations for solving the rendering equation have been developed. One successful set of approaches to approximating the rendering equation is to use sampling techniques. The integral is evaluated at a number of discrete values, which can be determined randomly, to produce a probabilistic estimate of the integral from the samples.

These procedures are referred to as Monte Carlo integration. An integral $F=\int f(x)dx$ can be estimated using Monte Carlo integration as $$F \approx \frac{1}{n} \sum_{i=1}^{n} \frac{f(X_i)}{p(X_i)}$$

where x is determined according to a random variable X, distributed according to probability density function p(x). The mathematics shows that so long as the sampling is performed correctly, the estimate eventually will converge to a correct result. A principal issue arising in Monte Carlo integration is getting acceptable accuracy with a reasonable or limited number of samples. Having too few samples results in an excessively noisy image and taking additional samples of pixels that have actually converged is wasteful.

SUMMARY

One aspect relates to a method of controlling a ray-tracing based rendering system. The method provides for emitting rays, during a sampling period, to be traced for each pixel of a set of pixels of a 2-D image to be rendered from a 3-D scene. Outputs are contributed to respective sample buffer locations for each of the pixels according to how the emitted rays are resolved. Temporally distributed convergence evaluation events are provided in the sampling period, during which convergence of each pixel of the set of pixels is evaluated to produce respective convergence information for each pixel of the set. Emission of rays is adapted for a pixel responsive to both convergence information generated from samples internal to the pixel, and from convergence information for one or more surrounding pixels.

Another aspect includes a machine for rendering a 2-D representation of a 3-D scene. The machine includes a sampler for sampling a 3-D scene for a set of pixels being rendered and a sample buffer in a tangible machine readable medium coupled to the sampler for storing samples taken by the sampler. The machine includes a controller for controlling the sampler according to a method. The method provides maintaining the set of pixels being sampled, from pixels of a 2-D representation being rendered. A pixel convergence criteria is defined. A plurality of sampling passes for each pixel of the set is conducted. For each pass in which a pixel meets the convergence criteria, a remaining convergence requirement to remove that pixel from the set of pixels being sampled is reduced, until that pixel has no remaining convergence requirement. When that pixel has no remaining convergence requirement, that pixel is considered to be fully converged and thus can be removed from the set of pixels being sampled. However, when any of the pixels fails the convergence criteria, the remaining requirement for convergence for that pixel is increased. Also, an adjacent pixel that was removed from the set of pixels is returned, and a remaining convergence requirement for each such pixel is increased.

Another aspect comprises a method of controlling a ray-tracing based rendering system comprises emitting a respective plurality of rays to be traced for each pixel of a set of pixels of a 2-D image to be rendered from a 3-D scene. For each pixel of the set of pixels, the method provides for adding color information generated by resolving the plurality of rays for each pixel to a current accumulated render output for that pixel to produce an updated render output for that pixel. The then-current accumulated render output and the updated (taking into account additional samples taken after the then-current accumulated render output as produced) render output are differenced to produce a render difference. If the render difference is less than a threshold, then the method reduces a remaining convergence requirement for the pixel, and if the remaining convergence requirement indicates that the pixel is converged and the pixel is removed from the set of pixels. A removed pixel can be returned to the set of pixels responsive to an adjacent pixel having a render difference greater than the threshold. A remaining convergence requirement can be increased when the removed pixel is returned to the set of pixels.

Renderers can produce intermediate rendering outputs for a plurality of pixels. From these intermediate outputs, a determination whether to perform further rendering operations for each pixel of the plurality of pixels can be made. Each pixel has neighbor pixels and non-neighbor pixels. A convergence threshold for a pixel can be increased in response to neighboring pixels failing to meet a respective convergence threshold applied to those non-neighbor pixels. The convergence thresholds applied to each pixel can include a standard deviation or differencing criteria between an accumulation of samples for each pixel available at one time, and an accumulation of samples for that pixel available at a subsequent time. The convergence criteria can be viewed as identifying pixels for which a dispersion of samples is higher than a threshold, and identifying pixels of the plurality for which a dispersion is lower than a threshold, but which have neighboring pixels with dispersions higher than the threshold In an aspect, convergence status for pixels are maintained and for a given pixel, if a neighboring pixel is unconverged, while that pixel is converged, then the 3-D scene is sampled the 3-D scene with one or more additional samples for the pixel having converged status. The pixel that was considered converged is re-evaluated based on the one or more additional samples to determine whether the one or more additional samples confirm that the pixel has converged. If the one or more samples indicate lack of convergence, then that pixel is set up for additional samples to be taken. As such, aspects include that convergence decisions for pixels are made based on internal information for a pixel, and convergence information for adjacent pixels, and a variety of particular examples are disclosed.

Above, aspects were described from the perspective of a grid of pixels in a 2-D image. A 2-D image is an example of a plurality of data elements, where each of the data elements has a pre-defined relative relationship with a selection of other data elements. A convergence decision for each data element can be made on a respective previous accumulated value and a respective current accumulated value for that data element. Each accumulated value is composed of respective pluralities of samples obtained from one or more sampling passes, wherein the convergence decision is either that the data element has converged to a value or not. A determination whether to revise the convergence decision for each data element can be made by searching for a data element with which that data element has a pre-defined relative relationship and which is not converged, and if there is such a data element, returning that pixel to unconverged status for at least one additional sampling pass.

BRIEF DESCRIPTION OF THE DRAWINGS

FIG. 1 depicts example components of a system that can implement aspects of the disclosure;

FIG. 2A depicts aspects of a 2-D representation comprising pixels being rendered;

FIG. 2B depicts aspects of data stored for a pixel being sampled in accordance with the disclosure;

DETAILED DESCRIPTION

Figure 3:
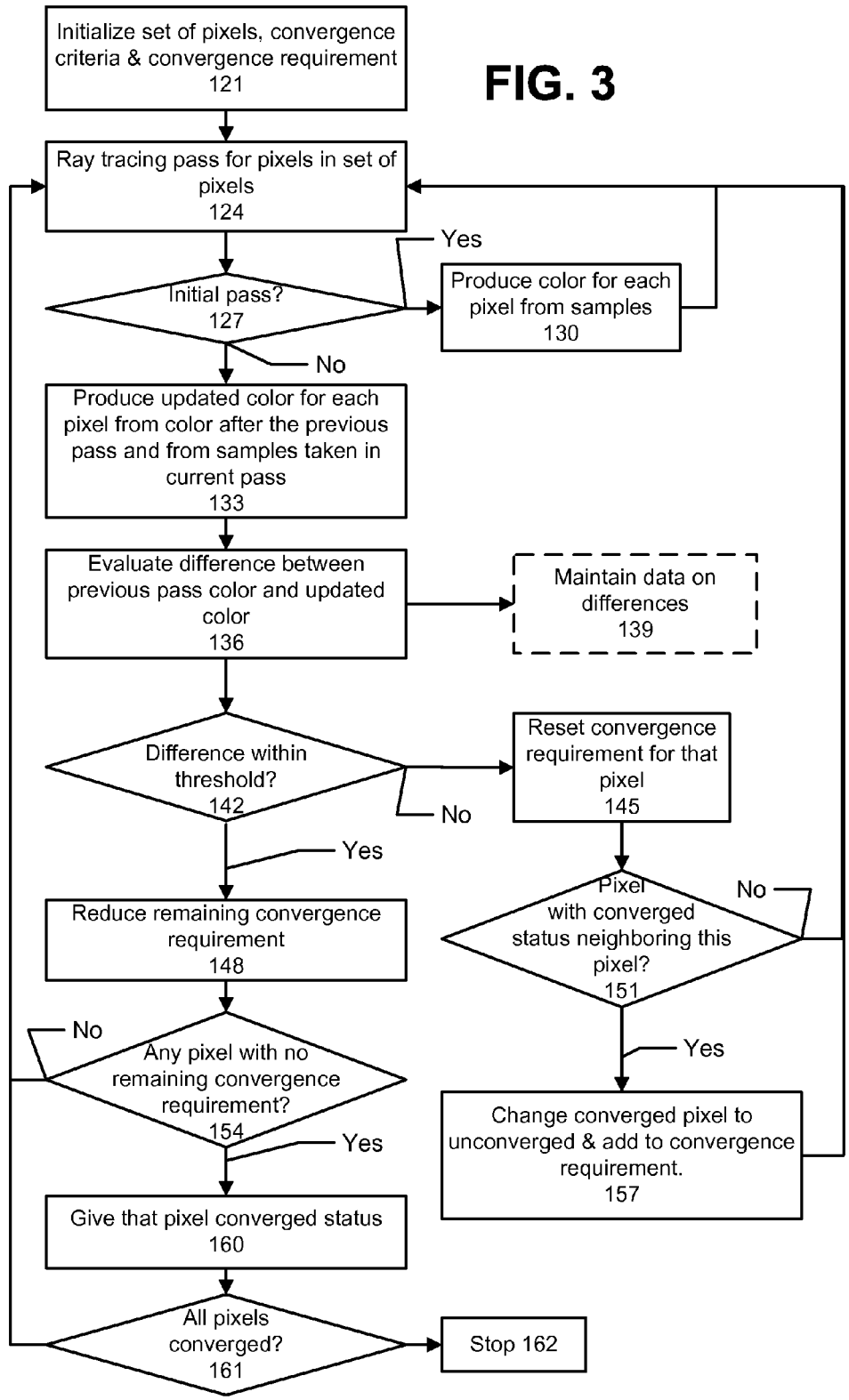
FIG. 3 depicts an example process according to the disclosure.

In ray tracing, rays may be emitted, where each ray associated with a respective pixel. Such rays can be tested for intersection and shaded. In recursive ray tracers, a path of rays is determined and then recursively rolled up. In a non-recursive ray tracer, rays can be traced and shaded in an order that may be determined based on efficiency of intersection testing for those rays, shading of the rays, or both. During shading, further rays can be emitted which are to be processed. It may be desirable to have many more rays in flight to increase a number of rays available to be grouped for concurrent processing. The following presents approaches to conducting progressive refinement of rendering outputs, such as rendering outputs from ray tracing.

FIG. 1 depicts an example system comprising a sampler 50 coupled to a sample buffer 58. In one example, sampler 50 includes a camera shader 75 that operates to emit rays to be traced in a 3-D scene. Rays emitted by the camera shader are associated with a respective pixel. Rays can be defined (e.g., origin and direction of such) using stochastic methods. Emitted rays can be traced in the scene by ray intersecter 77, which operates to identify a closest intersection of the ray and an object in the 3-D scene, if any exists. Ray intersecter 77 can be implemented using a single instruction multiple data (SIMD) processor unit, programmed to implement testing algorithms for acceleration structure elements and for primitives, for example. Ray intersecter 77 also can be implemented using fixed function hardware, in which dedicated hardware is provided for one or more portions of an intersection testing algorithm. In some implementations ray intersecter 77 includes functionality to gather rays into collections, and cause groups of rays to be tested concurrently.

A ray shader 79 can be implemented by one or more portions of machine executable instructions executing on a processor, in an example. Ray shader 79 determines color information to be contributed to a location in sample buffer 58 associated with the pixel linked to the ray being shaded. Ray shaders also can output further rays to be processed in a similar manner. For example, reflection, refraction and shadow rays can be emitted. These rays all can contribute some element of information to a final render output for an associated pixel. In a specific example, rays can be emitted for different pixels, and intersections involving these rays can be shaded, potentially resulting in further rays to be tested and shaded (as shown by a feedback loop from ray shader 79 to ray intersecter 77). In some implementations, all of these rays may be candidates to be tested concurrently with each other for intersection, even though they may be associated with different pixels and may have been emitted for different purposes. For example, rays may be collected for testing based on an area of a scene awaiting traversal by the rays. In such an approach, rays may complete intersection testing in an order different than they started, or were emitted. Additionally, rays also may be collected for parallel shading where one or more of the same shader code and shader data may be used during such shading. Thus, contributions to sample buffer 58 may be in an order different than how rays were submitted.

Nevertheless, determining how much to sample each pixel can be an important component in achieving an efficient rendering system that still outputs an image of desired quality. Too little sampling can result in noisy or low quality images, while unnecessary sampling wastes processing resources and consumes render time. However, separating unnecessary sampling from useful sampling is a complex problem. Additionally, providing an approach to adaptive sampling and progressive refinement that can handle ray tracing architectures that provide increased concurrency of ray intersection testing and shading and do so in a relatively memory efficient manner would be welcome.

In the example system of FIG. 1, a differencer 52 uses information from sample buffer 58 to produce difference information for pixels between multiple sampling passes. A convergence updater 54 tracks convergence information for a set of pixels for which samples are being taken, and uses difference information generated from differencer 52. Such convergence information can be tracked using pixel convergence counts 56, as described in more detail below. A selector 60 of pixels for further sampling uses convergence information from convergence updater 54. Selector 60 controls sampler 50 to obtain further samples for a set of pixels. An example process that can be performed by systems according to the disclosure is presented with respect to FIG. 3.

In this disclosure, the set of pixels can be inferentially defined based on which pixels as actively being sampled for a given sampling pass or at a given sampling opportunity. For example, a sampling flag can be provided for each pixel, indicating whether that pixel is to be sampled or not. Blocks, ranges, or regions of pixels can be identified by the same data or flag. The values of the flags then determine the members of the set of pixels.

Sampling as conducted by machines and systems according to the disclosure can be organized into sampling periods. Sampling periods may correspond to individual frames in a sequence of frames being rendered (e.g., during an animation). Such individual frames can correspond to displayable frames, or may be inputs to further processing that results in displayable frames (of course, such rendering outputs are not required to be displayed and can be stored or used as inputs to other processes). Within a sampling period, a number of passes can be conducted. A pass is a sampling for a set of pixels, where the set of pixels is maintained based on which of the pixels is determined to be unconverged, according to the approaches disclosed herein. A pass can be pre-defined according to a certain sampling strategy, or can be defined by samples occurring between convergence evaluation events, which can be triggered according to any of a variety of inputs or processes.

FIG. 2A depicts a 2-D array of pixels 101, where each pixel includes a convergence status (being either "NC" for non-converged and "C" for converged) and a current color. Representative pixels 103-106 are identified. In the context of the following disclosure, a set of pixels for which samples are being taken would include the pixels having non-converged status, i.e., pixels 103-105 in FIG. 2A. When a pixel changes from non-converted to converted status, it is removed from the set of pixels and vice-versa. Data for array 101 can be stored in sample buffer 58. FIG. 2B depicts that for a pixel (pixel 103, in particular) being sampled (because it has not been found to be converged), sampled data that has been accumulated up to a certain sampling point (described as the sampled data for pass n), is maintained separately from a sample data being accumulated that includes sampled data information added to the sampled data from pass n, as a result of subsequent sampling. This sampled data is called the sampled data for pass n+1. Such data can be stored in sample buffer 58. For pixels that are considered converged in pass n, e.g., pixel 106, further sampling is not being conducted in pass n+1, so sample buffer 58 may store only the final sample data realized at the end of sampling of pass n. In some implementations, sample buffer 58 may allocate additional space for the current sampling pass (pass n+1 in FIG. 2B). In some implementations, sample buffer 58 may pre-allocate space for all pixels to store two separate sets of sample data for a pass, and for a subsequent pass. As explained further below, passes may be defined based on occurences of convergence evaluation events. FIG. 2A presents an example where sample buffer 58 stores color information, while FIG. 2B depicts a more general example, where any of a variety of pixel attributes can be sampled; this is described in more detail below.

FIG. 3 depicts an example process in which aspects of the disclosure can be practiced. At 121, a set of pixels to be sampled is initialized, and a convergence criteria and a convergence requirement can be set. The set of pixels can be initialized as an entire image to be rendered, for example. The set of pixels is updated to remove pixels that are found to be converged, according to the process. An example convergence criteria includes that an accumulated color for a pixel, before taking a pass of samples, is within a threshold of an updated accumulated color that includes data for the pixel obtained during the pass of samples. An example of a convergence requirement (or part thereof) is that a pixel meet a convergence requirement for a (consecutive) number of passes. The number of passes can be set according to factors described below, and can be adjusted based on conditions detected during sampling.

At 124, a ray tracing pass is conducted for the set of pixels (ray tracing being a specific example of sampling). Because in this example, the convergence criteria includes comparing an accumulated color for a pixel between multiple passes, at least two passes of ray tracing are conducted. So, at 127, if the pass being conducted is the initial pass, at 130, a respective initial color is produced for the pixels of the set and the process returns to 124 for a subsequent pass. If the pass is not an initial pass, then at 133, an updated color for each pixel of the set is produced. The updated color for each pixel uses the existing color for that pixel and adds color information obtained by the sampling undertaken in the current pass. A variety of specific implementations can be provided. For example, the existing color for each pixel can be copied to a new buffer location, and as contribution from the subsequent sampling pass is realized, that contribution can be added to the appropriate pixel location in the new buffer. In another example, a buffer can be allocated to accumulate samples for the current ray tracing pass, and at an end of the pass, the accumulated color for that pixel can be added to the existing accumulated color. A variety of other approaches can be implemented in order to realize a situation where an existing and an updated color are available for comparison.

At 136, a difference between the color at the end of the previous pass for the pixel and the updated color is evaluated. At 139, data concerning the evaluated difference can be maintained; this maintained data can be used in aspects described below. At 142, a determination whether the difference is within a threshold is made and if the difference is within the threshold, then, at 148, a convergence requirement for the pixel is reduced. As a specific example, a convergence requirement can include that a convergence criteria (such as that the differences produced for a pixel between passes must be within a threshold) be met for a defined minimum number of passes before the pixel can be considered converged. Thus, a difference within a threshold is a criteria for convergence that allows part of an ultimate convergence requirement to be considered satisfied. In sum, evaluating a difference between a pixel color before and after a further sampling pass, and setting a maximum threshold difference to indicate that the pixel is converging provides an example of a convergence criteria (as explained above). The threshold can be set in 121.

Evaluating a difference between the colors and comparing that difference with a threshold can be implemented in a variety of ways. For example, the difference can be taken and evaluated in an unsealed color representation space, or after scaling or converting into another color representation. Luminance and chrominance can be evaluated separately and given different thresholds, e.g., a threshold for luminance can be set lower than a threshold for chrominance difference. Such evaluation can be conducted in steps, e.g., if luminance fails a difference test, then chrominance does not need to be checked. Similarly, if using a color triple, such as RGB, the colors can be checked serially and if one color channel fails, then the other color channels do not need to be checked. As an example, one channel for each of a plurality of pixels can be tested in parallel. Such differencing and thresholding can be implemented in fixed function hardware or in a programmable processor configured by computer executable instructions.

Additionally, color is an example of data that can be produced by rendering. However, implementations are not restricted to evaluation of color images, or even restricted to data that is intended to be interpreted visually. For example, implementations of the convergence evaluation process described here can be applied in a variety of other settings in which ray tracing can be applied, such as in reflector and lens analysis, or in situations where rendering outputs are inputs to a numerically analysis problem, such as light energy flux analysis, and so on.

By further example, a variety of attributes of a pixel can be sampled, such attributes can include alpha, depth and normal direction. In FIG. 2B, data for these attributes can be stored in sample buffer 58. There may be situations where a color of a pixel is found to be converged, but other attributes still are found unconverged according to an implementation of the convergence criteria disclosed here. In some implementations, in order to stop sampling a pixel (finding it converged), each attribute, e.g., color, depth, alpha, and so on, must be found converged.

A difference threshold can be expressed in relative terms, such as a percentage, rather than in absolute terms. The color data also can be transformed into a different space, such as a logarithmic space, and then the differencing and thresholding can be performed on the logarithmic quantities. Other indicators or analysis approaches to evaluate a difference between a pixel value between passes can be provided, and the above approaches are exemplary, rather than limiting. In some implementations, the differencing and thresholding can be performed in a linear or log color space. However, such differencing and thresholding can be performed in a tone mapped space. The differencing and thresholding would be adapted according to a tone mapped operator being applied for a particular set of pixels, in such implementations.

At 154, if the convergence requirement was reduced at 148, a determination whether there is a pixel without any remaining convergence requirement is conducted. In the specific example where a count is reduced for each pass in which the difference described at 136 & 142 is within a threshold, determination 154 can include checking whether that count has reached 0 (or some other number indicative of having succeeded in the required number of passes). If so, then that pixel can be considered converged and removed from the set of pixels for which sampling passes are being conducted. At 161, a determination whether all pixels have converged status is made and if so, then the process can stop at 162. Otherwise, the process can return to 124, in which another ray tracing pass is conducted.

If a pixel fails to have a color difference within the threshold, then a convergence requirement for that pixel can be reset at 145. Where the convergence requirement is that a minimum number of passes result in a color difference within the threshold, resetting comprises resetting a count to an initial value (e.g., an implementation can count down from the minimum value to 0, and resetting includes resetting the count to the minimum value).

A failure of a pixel to remain within the threshold also triggers an examination of neighboring pixels. At 151, it is determined whether there are pixels that have converged status adjacent to the pixel that failed its threshold test. If there is such a pixel (or pixels), then each such pixel is reverted to an unconverged status, which can be implemented by returning the pixel to the set of pixels for which sampling is conducted. In an example, a pre-determined number of passes are added to a convergence requirement for that pixel; such number can be less than the initial number of passes set at 121.

The number of passes added to the convergence requirement for a converged pixel adjacent to a pixel failing the convergence criteria can be varied based on a number of factors. In one example, a degree by which the pixel failed can be a parameter influencing the number. If the failing pixel failed by a large amount, then more passes can be added to be taken for pixels adjacent the failing pixel. Such data can be retrieved from stored difference data (139, above). A distance between the converged pixel and the failing pixel also can influence the number of passes added. As such, adjacency can be a fuzzy parameter in that adjacency is not limited to being directly touching. Additionally, even though pixels may be directly touching, pixels directly touching in cardinal directions are closer than those that touch only at corners (diagonally). In one example, more passes are added for pixels touching in cardinal directions than diagonally.

The above process was described in a generally serial flow, for clarity. However, it should be appreciated that a plurality of pixels can be processed in parallel. Also, it should be appreciated that there may be situations where a converged pixel is adjacent to more than one pixel that fails to meet the convergence criteria. In one approach, after that pixel has been changed from converged to unconverged status, and added to the set of pixels for further sampling passes, that pixel would not be processed again, and no additional sampling passes are added by virtue of being adjacent to multiple failing pixels. Therefore, not all portions of the process depicted in FIG. 3 may be performed for each pixel in each pass. However, implementations may be provided to use those situations as a factor in setting a number of passes to add to the convergence requirement for that pixel.

As would be apparent from the above, when a pixel is changed from converged to unconverged status in response to an adjacent pixel failing a convergence criteria, that pixel can itself fail a subsequent convergence criteria, and have its convergence requirement reset at 145. Alternatively, the requirement can be reduced for each subsequent pass until again the pixel has satisfied the convergence requirement. Thus, returning a pixel to unconverged status for a certain number of passes, in response to an adjacent pixel failing a convergence criteria, allows further confidence to be obtained that the pixel has actually converged.

The term "pass" was used in describing the example process of FIG. 3, which is an example of a convergence evaluation event, which is a trigger to evaluate convergence of one or more pixels. For example, sampling of pixels does not to be confined to discretely identifiable passes, but rather can be a continuous process. An evaluation process can run in parallel with the sampling process and enqueue sampling work to be performed. For example, an evaluation process can read an accumulated pixel color at various times, independent of the sampling of that pixel, and evaluate convergence according to the disclosure even as sampling for the pixel continues. Also, other convergence evaluation events can be provided in addition to sampling counts.

A person of ordinary skill may also appreciate from the above that a situation may arise where a converged pixel could be repeatedly changed from converged to unconverged status, resulting in more sampling passes, only to return to converged status after the added convergence requirement has been met, because one or more neighboring pixels repeatedly fail convergence criteria, but the converged pixel was accurately found to be converged. In some implementations, processes can be modified to set a limit on a number of times that a pixel can be taken from converged to unconverged status. That limit can be based on a variety of factors, and can be set for each pixel, or it can be fixed (e.g, at 121). Example factors include how badly adjacent pixels have failed convergence criteria, and an overall variance or dispersion in the differences obtained for the pixel over the passes conducted. Other factors can be determined by experimentation or by other heuristics.

Of course, the general case is that any pixel becomes increasingly accurate as more sampling is conducted, but this approach allows a memory efficient mechanism, which can be applied in out of order ray tracing and highly parallel ray tracing, to assess convergence status of pixels.

Figure 4:
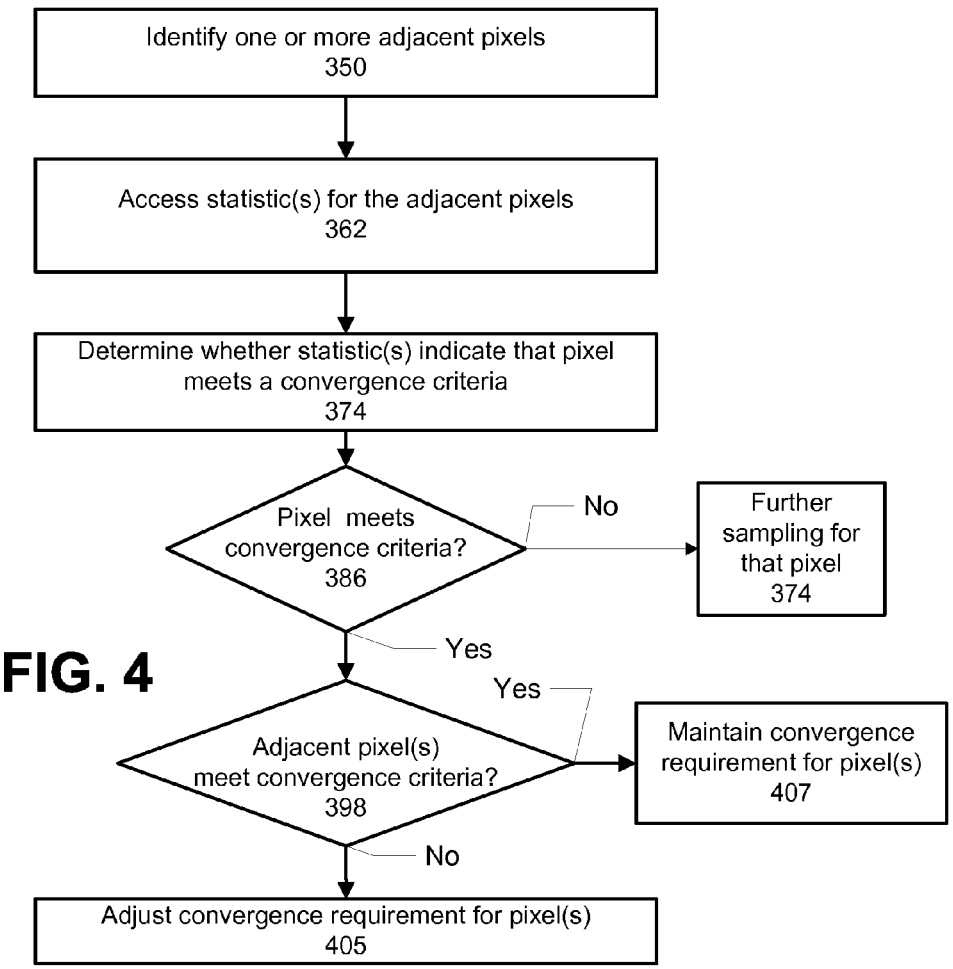
FIG. 4 depicts another example process according to the disclosure.

FIG. 4 depicts an example variation of the process of FIG. 3. In FIG. 4, assessment of whether pixels are converged can be deferred for a number of passes, rather than being determined for each pass of each pixel. FIG. 4 also depicts usage of a statistic that can be produced from difference data, in order to evaluate convergence of pixels. The process of FIG. 4 includes, at 350, identifying one or more adjacent pixels, and at 362, accessing statistic(s) relating to convergence for each of the pixels. At 374, a determination is made whether a pixel's statistic(s) indicate meeting convergence criteria. At 386, if the pixel is not meeting convergence criteria, then, at 374, more sampling is performed for that pixel. If the pixel does meet convergence criteria, but at 398, if adjacent pixel(s) do not, then a convergence requirement for that pixel is adjusted at 405. If adjacent pixels meet convergence criteria then each pixel maintains its present remaining convergence requirement at 407.

An example of a statistic that can be used for evaluating convergence is a statistic relating to dispersion of the differences between the mean of accumulated colors for each sampling pass through a plurality of passes. A rate of convergence can depend on aspects of the area being sampled and how the samples are determined and can be modeled by tracking a reduction in variance as the number of passes increases. For example, in Monte Carlo methods, for many pixels of a scene, a convergence rate is in the form of $k/N^{0.5}$ (where N relates to an amount of sampling), where k is a constant that is determined by fitting a curve to a set of data points. Fitting such a curve to an observed peak in a set of data points can be used to provide an estimate of a bound on the error in the set of data points. The data points can be samples for a pixel, and thus can be used as an error estimate for a given pixel, as part of convergence evaluation. For example, even if a pixel can pass some convergence criteria, an error bound determined here can be above the threshold, and then the pixel can be considered non-converged. This convergence evaluation technique can be implemented with minimal extra storage requirements, since only a k value (e.g. in floating point) for each pixel being sampled.

Where multiple convergence criteria are applied, they can be applied serially, in parallel, or a combination thereof. For example, using uniformly distributed random sampling, variance of the mean would decrease by order $O(1/N)$, and the error would decrease by order $O(1/N^{0.5})$ where N is a number of samples taken (and where a number of samples are taken for each pass, then the variance also would be expected to be a linear inverse relationship to the number of passes). Other sampling strategies may have different convergence curves, for example Quasi-Monte Carlo techniques can have worst-case convergence rates on the order of $O((\log(N)^{d}/N)$, where d is the dimension of the integral being evaluated. It is possible to fit curves to different convergence rates and store such coefficients in memory. These coefficients would be different for areas of the image that have different complexity (e.g., smooth areas versus areas with edges). As sampling passes are conducted, a curve can be fit to the standard deviation (or some other dispersion measure, as desired) to characterize a convergence rate being observed for a given pixel. A convergence rate of an adjacent pixel can be used as an input to the convergence requirement of another pixel. For example, if one pixel is observed to have a variance decreasing slower than an adjacent pixel, then the adjacent pixel can be treated as converging more slowly than observations suggest, resulting in more samples are taken for that pixel than would be suggested purely by a measure of dispersion of the outputs from the passes involving that pixel.

Figure 5:
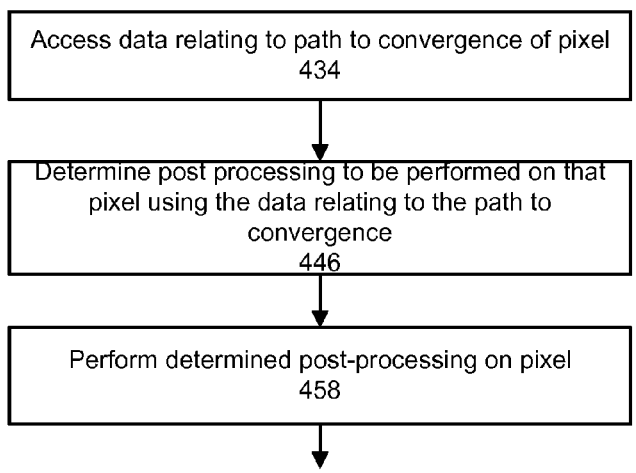
FIG. 5 depicts another example process according to the disclosure.

FIG. 5 depicts a process by which post-processing of pixel data can be selected according to a path to convergence of a pixel. At 434, data relating to a path to convergence of a given pixel to be post-processed is accessed. From that data, a particular selection of post-processing activities is made at 446, and those post-processing activities are performed at 458. In a particular example, data relating to a path to convergence may include a number of times that the pixel was taken from converged to unconverged status, which is an indication whether the pixel is adjacent to pixels that have had difficulty converging. Such a count can be maintained in a comparatively small area, compared with counting a number of samples taken for a pixel, for example. Data relating to a dispersion of color differences between convergence evaluation events can be maintained and used. If such dispersion is higher, then different post-processing may be selected for a pixel. Convergence trend information for pixels also can be maintained, which can measure whether a pixel converged uniformly or according to an expected convergence rate, given a certain sampling strategy, or slower than such rate. Filtering is an example of a post-processing activity that can be selected or adjusted based on characteristics of the accessed data.

Figure 6:
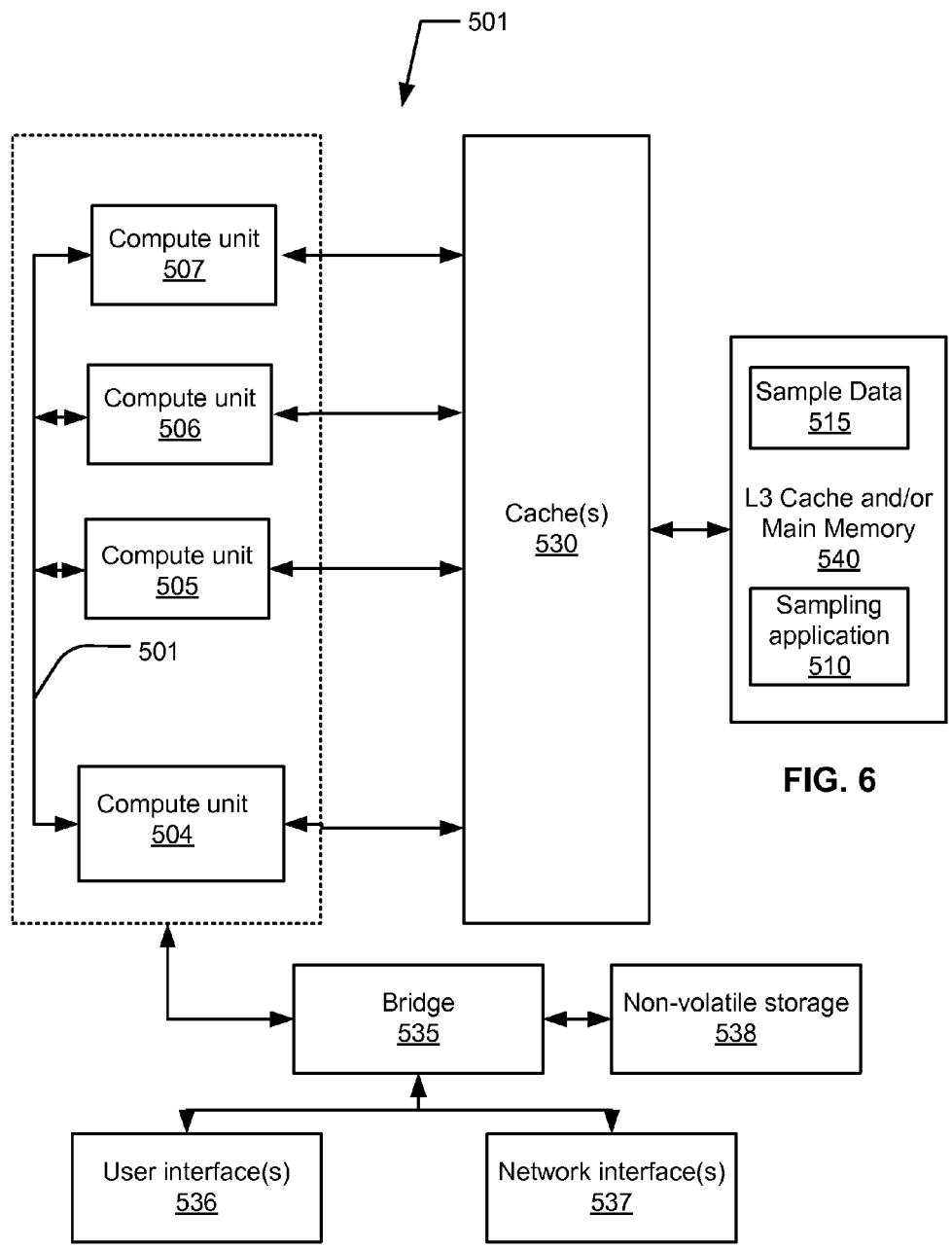
FIG. 6 depicts an example computing system in which aspects of the disclosure can be implemented.

FIG. 6 depicts an example computing system 501 in which disclosed aspects can be implemented. System 501 comprises a plurality of computing units 504-507. Computing units 504-507 may comprise any one or more of a plurality of processing cores or processors, each of which also may include various fixed function and/or programmable elements. The computing units 504-507 may also be implemented as different threads of computation on a multi-threaded processor, for example. Each computing unit 504-507 may have read and write access to cache(s) 530, which can be integrated with computing units 504-507, and which may comprise one or more levels of caches, which may be store data according to a variety of caching approaches. Caches 530 store subsets of data from further layers of a memory hierarchy, such an L3 cache and/or a main memory 540. In FIG. 6, memory 540 is depicted to contain sample data 515, generated according to the sampling techniques disclosed herein, and a machine readable instructions implementing a sampling application 510 that performs a process implementing aspects of the disclosure. A bridge 535 interfaces with compute units 504-507, and bridge 535 communicate with user interfaces 536 and network interfaces 537. User interfaces 536 may comprise a keyboard, mouse, and display, for example. Bridge 535 also may interface with non-volatile storage 538, such as a hard disk subsystem, or solid state memory. Memory 540 may be loaded with data from non-volatile storage 538.

The above disclosure described passes of ray tracing, in which samples are obtained for pixels. A number of passes could be varied for each pixel based on convergence behavior of neighboring pixels. In the context of Monte Carlo techniques applied to ray tracing, these passes can be passes to accomplish a particular sub-part of an overall rendering process, and each sub-part can thus have a variable number of passes performed. For example, techniques or effects such as motion blur, depth of field, soft shadows, different kinds of light sources, and so on may require different kinds and quantities of rays that are emitted by different portions of an overall rendering program (or different shaders in a rendering construct assembled to perform the rendering).

Additionally, although a pixel can be characterized as a square sub-portion of an image, no limitation is implied on the shape or size of pixels by the disclosure. Various related supporting processes such as filtering can be selected and adapted according to the particular implementation, and pixel shape is one parameter to be selected for an implementation.

Additionally, a variety of techniques can be practiced in the context of the implementations of the disclosure. For example, quasi Monte Carlo sampling, stratified sampling, importance sampling, low discrepancy sequences, biased and unbiased sampling can be performed. Multiple techniques can be used within a rendering. These are all examples of techniques used to determine a reliable and (desirably efficient) estimator for the integrations that are performed during ray tracing. Implementations of the disclosure can be used to evaluate and control the sampling implemented by these approaches. In particular, the above sampling strategies can be used to produce the samples taken within a pass, and which result in the accumulated color output following each pass. As described above, subsequent accumulated color output are differenced with respect to previous accumulated color output. Thus, an appropriate sampling strategy can be implemented in conjunction with these disclosures.

The term "ray tracing" is used herein in the general sense to encompass a variety of related techniques, including ray casting, recursive ray tracing, path tracing, and radiosity. Also, implementations were described with respect to emitting rays for pixels of an image, and assessing convergence of a pixel color. However, implementations of the disclosed techniques can be used to assess sufficiency of sampling for sub-parts of a rendering, independent of other parts. For example, if it were desired to evaluate radiance on a surface, these techniques can be practiced to evaluate soundness of the estimates for radiance at different points on the surface.

This description uses the example of sampling pixels that are relatively arranged in a 2-D grid to explain the adaptive sampling techniques here. This example is illustrative of a more general usage of these disclosed techniques in the context of other situations where adaptive sampling may be useful. For example, disclosure of sampling pixels includes producing texels or other kinds of data that may capable of being visually displayed. These techniques also can be applied more generally to situations where data is being generated that has a predefined spatial arrangement such that data elements are organized in a spatially relative way with respect to other data elements. A spatial arrangement used in the examples was a two-dimensional arrangement of image data (e.g., pixels). However, spatial arrangements of sampled elements in which aspects of the disclosure may be practiced are not confined to only 2-D arrangements. For example, 3-D arrangements of elements may be sampled. In a particular example, a 3-D arrangement of elements, for which an integral is to be evaluated for each element can be provided. These disclosures further generalize to a situation where a set of elements each having arbitrary dimension are to have an integral evaluated for each element, and where there is a probability that each element is more correlated with nearby elements than more distant elements. In other words, a condition that each element be most closely correlated to its neighbors may not hold, but that in the aggregate, neighboring elements correlate to each other more than non-neighbor elements do.

Distance can be evaluated by a variety of techniques, such as a sum of squared differences between the values of each dimension for each element. For example, in 2-D, where the dimensions are X and Y, an element E1 can be ascribed a respective distance to E2 and to E3 by evaluating $D(E1 \text{ to } E2)=(E1(X)-E2(X))^2+(E1(Y)-E2(Y))^2$ and $D(E1 \text{ to } E3)=(E1(X)-E3(X))^2+(E1(Y)-E3(Y))^2$. Euclidean and non-Euclidean geometric concepts can be employed in evaluating distance.

As would be apparent from the disclosure, some of the components and functionality disclosed may be implemented in hardware, software, firmware, or any combination thereof. If implemented in firmware and/or software, the functions may be stored as one or more instructions or code on a computer-readable medium, in one example, the media is non-transitory. Examples include a computer-readable medium encoded with a data structure and a computer-readable medium encoded with a computer program. Machine-readable media includes non-transitory machine readable media. Other kinds of media include transmission media. A non-transitory medium may be any tangible medium that can be accessed by a machine. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a machine.

Those of skill will also appreciate that the various illustrative logical blocks, modules, circuits, and algorithm steps described in connection with the embodiments disclosed herein may be implemented as electronic hardware, computer software in a computer-readable medium, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The description of the aspects and features is provided to enable any person skilled in the art to make and use the systems, apparatuses and perform the methods disclosed. Various modifications will be readily apparent to those skilled in the art, and the principles described in this document may be applied to other aspects without departing from the spirit or scope of the disclosure. Thus, the description is not intended to limit the claims. Rather, the claims are to be accorded a scope consistent with the principles and novel features disclosed herein.

The drawings include relative arrangements of structure and ordering of process components, solely as an aid in understanding the description. These relative arrangements and numbering is not an implicit disclosure of any specific limitation on ordering or arrangement of elements and steps in the claims. Process limitations may be interchanged sequentially without departing from the scope of the disclosure, and means-plus-function clauses in the claims are intended to cover the structures described as performing the recited function that include not only structural equivalents, but also equivalent structures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than, additional to, or less than, those identified herein. Rather, the described features and steps are disclosed as examples of components of systems and methods within the scope of the appended claims.

We claim:

1. A machine for rendering a 2-D representation of a 3-D scene, comprising:
   a sampler for sampling a 3-D scene for a set of pixels being rendered;
   a sample buffer in a tangible machine readable medium coupled to the sampler for storing samples taken by the sampler;

a controller for controlling the sampler according to a method comprising:
maintaining the set of pixels being sampled, from pixels of a 2-D representation being rendered,
defining a pixel convergence criteria,
conducting a plurality of sampling passes for each pixel of the set,
for each pass in which a pixel meets the convergence criteria, reducing a remaining convergence requirement to remove that pixel from the set of pixels being sampled, until that pixel has no remaining convergence requirement, and responsively removing that pixel from the set of pixels being sampled, but
when any of the pixels fails the convergence criteria, increasing the remaining requirement for convergence for that pixel, returning pixels to the set of pixels that are adjacent to that pixel and were previously removed, if any, and adding to the respective remaining convergence requirement for each such pixel.

2. The machine for rendering a 2-D representation of a 3-D scene of claim 1, wherein the samples taken for each pixel in each pass are combined with an existing color for that pixel, to produce an updated color for that pixel, and the convergence criteria comprises determining whether the existing color and the update color for that pixel are different by more than a threshold.

3. The machine for rendering a 2-D representation of a 3-D scene of claim 1, wherein the method performed by the controller further comprises returning a pixel to the set of pixels being sampled responsive to a pixel adjacent to that pixel failing the convergence criteria for a sampling pass.

4. The machine for rendering a 2-D representation of a 3-D scene of claim 1, wherein the convergence criteria for each comprises variances of samples taken for that pixel for multiple passes being within a threshold.

5. The machine for rendering a 2-D representation of a 3-D scene of claim 1, wherein the remaining requirement is defined as meeting the convergence criteria for a specified number of passes, and increasing the remaining requirement comprises increasing a remaining number of passes in the remaining requirement for convergence.

6. The machine for rendering a 2-D representation of a 3-D scene of claim 5, wherein the remaining requirement is increased by a number determined by an amount of separation between the pixel that failed the convergence criteria and adjacent pixels that did not fail the convergence criteria.

7. The machine for rendering a 2-D representation of a 3-D scene of claim 1, the increasing the remaining requirement for convergence for a pixel failing the convergence criteria and for pixels adjacent to that pixel comprises resetting the failing pixel to an initial number of passes, and adding one or more passes to the remaining requirement for adjacent pixels.

8. A method of controlling a ray-tracing based rendering system, comprising:
emitting a respective plurality of rays to be traced for each pixel of a set of pixels of a 2-D image to be rendered from a 3-D scene;
for each pixel of the set of pixels,
adding color information generated by resolving the plurality of rays for each pixel to an current accumulated render output for that pixel to produce an updated render output for that pixel,
differencing the current accumulated render output and the updated render output to produce a render difference,
if the render difference is less than a threshold, reducing a remaining convergence requirement for the pixel,
if the remaining convergence requirement indicates that the pixel is converged and removing the pixel from the set of pixels, and
returning the removed pixel to the set of pixels and adding to the remaining convergence requirement for the pixel, responsive to an adjacent pixel having a render difference greater than the threshold; and
repeating the emitting a respective plurality of rays to be traced for each pixel of the set of pixels.

9. The method of controlling a ray-tracing based rendering system of claim 8, further comprising resetting the convergence requirement for any pixel having a render difference greater than the threshold.

10. The method of controlling a ray-tracing based rendering system of claim 8, further comprising adding more to the remaining convergence requirement when the removed pixel is adjacent in a cardinal direction to the adjacent pixel than when the removed pixel is diagonal to the adjacent pixel.

11. The method of controlling a ray-tracing based rendering system of claim 8, further comprising adding to the remaining convergence requirement in dependence on an amount that the render difference was greater than the threshold.

12. The method of controlling a ray-tracing based rendering system of claim 8, wherein the render difference comprises a difference between colors of the updated render output and current accumulated render output.

13. A non-transitory machine readable medium storing instructions for configuring a machine to perform a method of rendering a 2-D image from a 3-D scene comprising:
for each of a set of pixels in the 2-D image, obtaining samples of the 3-D scene until reaching a convergence evaluation event;
evaluating convergence of pixels of the set of pixels using at least some of the respective samples taken for each pixel, wherein the evaluating indicates either that such pixel is converging or not;
responsive to the evaluating indicating that any of the evaluated pixels is converging, reducing a remaining convergence requirement for each such pixel; and
for any of the evaluated pixels found to not be converging, increasing respective remaining convergence requirements of pixels adjacent to those pixels.

14. The non-transitory machine readable medium of claim 13, wherein each convergence evaluation event is reached after taking a pre-determined plurality of samples for each pixel of the set of pixels.

15. The non-transitory machine readable medium of claim 13, wherein evaluating convergence of pixels comprises comparing an accumulated pixel color at an end of one convergence evaluation event with an accumulated pixel color at an end of a subsequent convergence evaluation event.

16. The machine non-transitory machine readable medium of claim 13, wherein evaluating convergence of pixels comprises comparing one or more of accumulated pixel luminance and chrominance following one convergence evaluation event with that following a subsequent convergence evaluation event.

17. The non-transitory machine readable medium of claim 13, wherein the samples for each pixel between each convergence evaluation event are combined with an existing color for that pixel, to produce an updated color for that pixel, and the evaluating convergence comprises comparing the respective existing and updated colors for each pixel.

18. The non-transitory machine readable medium of claim 13, wherein the remaining convergence requirement for each pixel comprises meeting a convergence criteria for a consecutive number of convergence evaluation events.

19. The non-transitory machine readable medium of claim 13, wherein the obtaining of a sample comprises emitting a ray associated with the pixel for which the sample is taken, and tracing that ray in the 3-D scene.

20. The non-transitory machine readable medium of claim 13, wherein the evaluating convergence of pixels of the plurality comprises obtaining variances of different subsets of the samples taken for a particular pixel and determining whether those variances are within a threshold of each other.

21. The non-transitory machine readable medium of claim 13, wherein the obtaining of a sample comprises emitting a camera ray associated with the pixel for which the sample is taken, and tracing that camera ray and any substituent rays in the 3-D scene, wherein the camera ray and each substituent ray may provide a contribution to the sample being taken.

22. The non-transitory machine readable medium of claim 13, wherein increasing respective remaining convergence requirements comprises either adding convergence evaluation events to be met for that pixel or resetting remaining convergence requirements to an initial value.

23. The non-transitory machine readable medium of claim 13, wherein the method further comprises removing a pixel from the set of pixels responsive to determining that no remaining convergence requirement exists for that pixel.

* * * * *

UNITED STATES PATENT AND TRADEMARK OFFICE
CERTIFICATE OF CORRECTION

PATENT NO. : 8,970,591 B2
APPLICATION NO. : 13/687535
DATED : March 3, 2015
INVENTOR(S) : Özdas et al.

It is certified that error appears in the above-identified patent and that said Letters Patent is hereby corrected as shown below:

In the specification

In Column 2, Line 53, delete "then the 3D scene is sampled the 3D scene with one or more" should read" and insert -- then the 3D scene is sampled with one or more --, therefor.

In Column 6, Line 15, delete "a determination whether" and insert -- a determination of whether --, therefor.

In Column 6, Line 56, delete "a numerically analysis problem," and insert -- a numerical analysis problem, --, therefor.

In Column 11, Line 53, delete "$(E1(X)E3(X))^2+(E1(Y)E3(Y))^2$)." and insert -- $(E1(X)E3(X))^2+(E1(Y)E3(Y))^2$. --, therefor.

In Column 12, Line 36, delete "These relative arrangements and numbering is" and insert -- These relative arrangements and numbering are --, therefor.

Signed and Sealed this
Twenty-first Day of June, 2016

Michelle K. Lee
*Director of the United States Patent and Trademark Office*